United States Patent [19]

Gudat et al.

[11] Patent Number: 5,546,093

[45] Date of Patent: Aug. 13, 1996

[54] SYSTEM AND METHOD FOR PROVIDING NAVIGATION SIGNALS TO AN EARTHMOVING OR CONSTRUCTION MACHINE

[75] Inventors: Adam J. Gudat, Edelstein; Gregory R. Harrod, Peoria, both of Ill.

[73] Assignee: Caterpillar Inc., Peoria, Ill.

[21] Appl. No.: 558,037

[22] Filed: Nov. 13, 1995

Related U.S. Application Data

[63] Continuation of Ser. No. 177,040, Jan. 4, 1994, abandoned.

[51] Int. Cl.$^6$ .............................. H04B 7/185; G01S 5/02
[52] U.S. Cl. ............................................. 342/357; 37/414
[58] Field of Search ................................... 342/357, 457; 364/449, 424.01, 424.04, 436, 444, 460, 461; 299/1.05, 1.3, 1.4; 37/414

[56] References Cited

U.S. PATENT DOCUMENTS

| | | | |
|---|---|---|---|
| 4,814,711 | 3/1989 | Olsen et al. | 342/357 |
| 4,818,107 | 4/1989 | Ono et al. | 340/988 |
| 4,884,208 | 11/1989 | Marinelli et al. | 364/449 |
| 5,068,654 | 11/1991 | Husher | 342/457 |
| 5,144,317 | 9/1992 | Duddek et al. | 342/357 |

*Primary Examiner*—Theodore M. Blum
*Attorney, Agent, or Firm*—James R. Yee

[57] ABSTRACT

A system and method for providing navigation signals between first and second earthmoving or construction machines is provided. The system determines the positions of the first and second machines. The system determines a desired location of the second machine relative to the first machine based on an optimum path. This desired location is transmitted from the first machine to the second machine.

18 Claims, 14 Drawing Sheets

SYSTEM AND METHOD FOR PROVIDING NAVIGATION SIGNALS TO AN EARTHMOVING OR CONSTRUCTION MACHINE

This is a file wrapper continuation of application Ser. No. 08/177,040, filed Jan. 4, 1994, now abandoned.

TECHNICAL FIELD

This invention relates generally to earthmoving or construction machines and more particularly to a system for providing navigation signals between two or more earthmoving machines.

BACKGROUND ART

Currently, there is a large effort to automate labor intensive operations and processes. For example, the operations performed by earthmoving or construction machines lend themselves to the benefits of automation. The machines perform many repetitive tasks which are usually performed by skilled operators. Also, automation of their operation would allow near continuous operation of the machines which would improve efficiency and productivity.

Automation of large earthmoving or construction machines is very complex and involves the solution of many problems. First, an accurate determination of the position of each machine must be made. Such determinations have been attempted through "dead-reckoning" systems, laser beam reference systems and satellite based systems.

Dead-reckoning systems use on-board odometers, speedometers, and/or other devices to measure the distance and direction a machine has traveled. Such systems are relatively simple and inexpensive, but are not as accurate as the other two systems.

Laser reference systems provide a laser reference, usually via a laser beam rotated in a plane. While tending to be more accurate then dead-reckoning systems, laser reference systems require each machine to be equipped with laser beam sensors. Additionally, the precise location of each laser emitter must be known. Thus, an emitter cannot be moved without determining the precise location of its new position. This limits the effective range and usefulness of laser reference systems.

In addition, particles in the surrounding air, for example, rain, snow, or dust, will obscure the laser beam and prevent the sensors form detecting the laser beam.

Furthermore, the laser beams have a limited range of, generally, less than 1 kilometer.

Satellite systems are based on signals received from earth-orbiting satellites. Each machine includes a receiver for receiving the signals transmitted by the satellites and utilizes triangulation methods for determining its position.

A second problem to be overcome in automating such systems is scheduling. Typically in a non-automated system, a dispatcher, located at a central location, tracks the locations of the machines in the system via radio communications with the drivers of each machine. The dispatcher also has a record of the work required to be accomplished at the site. The dispatcher then radios the operators to travel to locations within the site to perform specific work.

In an autonomous system, the human dispatcher is replaced with a computer based dispatcher or scheduler. The scheduler is located at a central location, the base station. Like the human dispatcher, the scheduler tracks the location of autonomous machines and the work needed to be done. Also, the scheduler commands the autonomous machines to travel to locations to perform specific work.

However, once the machines are situated at the specific work areas, if the work to be done requires cooperation between two or more machines, the control of each machine becomes more complex. For example, in a digging and loading operation performed by at least one loading machine and one or more hauling machines, the loading machine must travel a path from a digging position to a dumping position. Also, the control of the machines must take into account the local geography and obstacles. Further, the exact position of each machine becomes more critical because of the close proximity of the other machines. Therefore, it may be more desirable to provide more localized control and planning during operations requiring cooperation between two or more machines.

The present invention is directed to overcoming one or more of the problems, as set forth above.

DISCLOSURE OF THE INVENTION

In one aspect of the present invention, a system for providing navigation signals between first and second earthmoving or construction machines is provided. The system determines the position of the first machine. The system determines a desired location of the second machine relative to the first machine based on an optimum path of the first machine. This desired location is transmitted from the first machine to the second machine.

In another aspect of the present invention, a method for providing navigation signals in a system with first and second machines operating at a work site is provided. The method includes the steps of determining the position of the first machine and determining a desired location of the second machine as a function of the first position and responsively producing navigation signals as a function of the desired location.

BEST MODE FOR CARRYING OUT THE INVENTION

With reference to the FIGS. 1–11, the present invention provides a system 400 for use in an autonomous or semi-autonomous mine site. The system 400 includes at least two machines. For purposes of discussion, the following description will include a loading machine 102, for example, a wheel loader (WL) and a hauling machine 302, for example, an off-highway truck.

Figure 1:
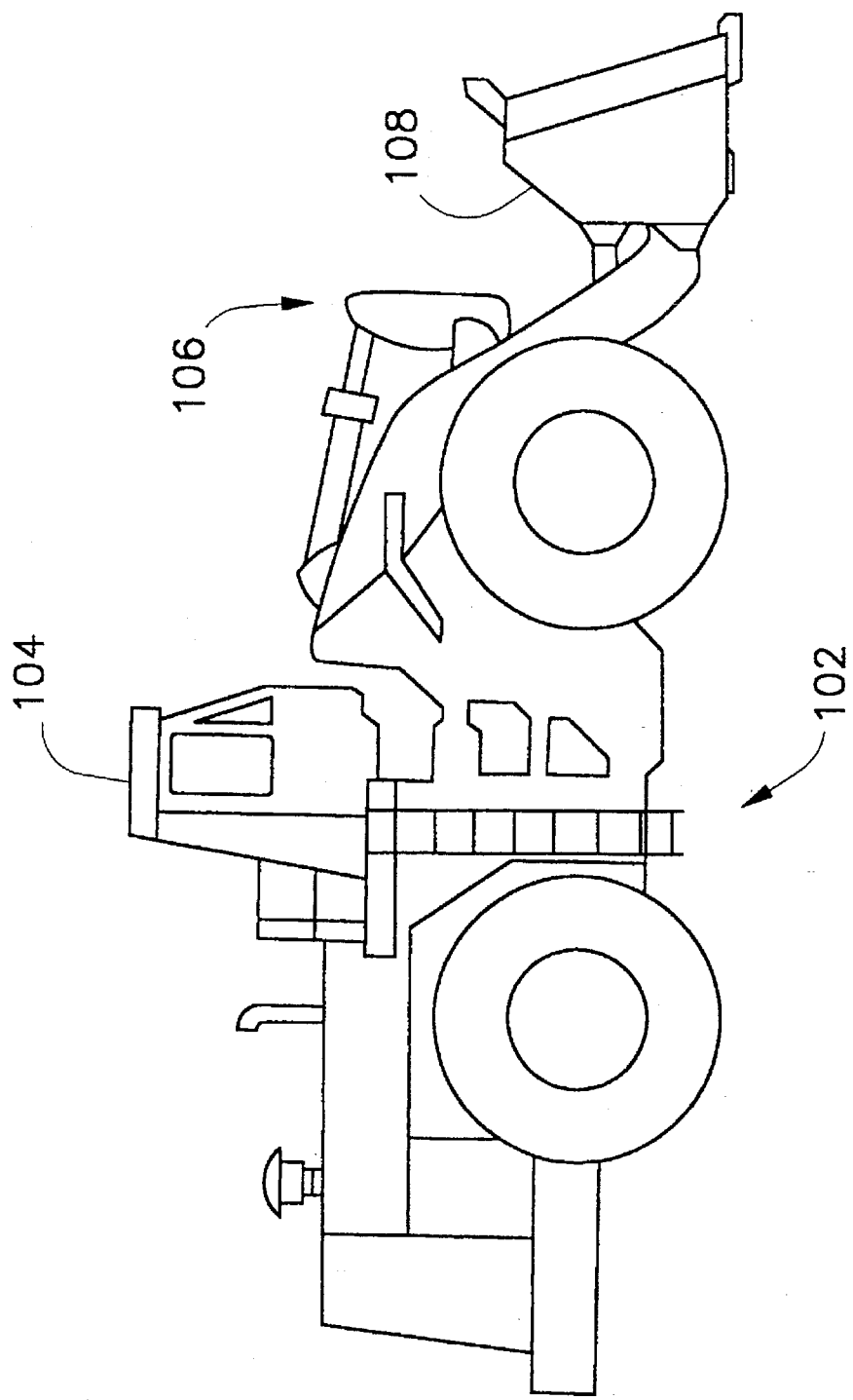
FIG. 1 is an illustration of a loading machine having an operator's cab and a work implement.

With particular reference to FIG. 1, an illustration of a wheel loader 102 is shown. The wheel loader 102 includes an operator's cab 104 and a work implement 106. The work implement 106 is adapted for digging/loading material and dumping into the hauling machine 302. In the preferred embodiment, the work implement 106 includes a bucket 108. While the following discussion refers to the loading machine 102 as a wheel loader it is to be realized that other types of loading machines, for example, an excavator or shovel, may be substituted without departing from the spirit of the present invention.

Figure 3:
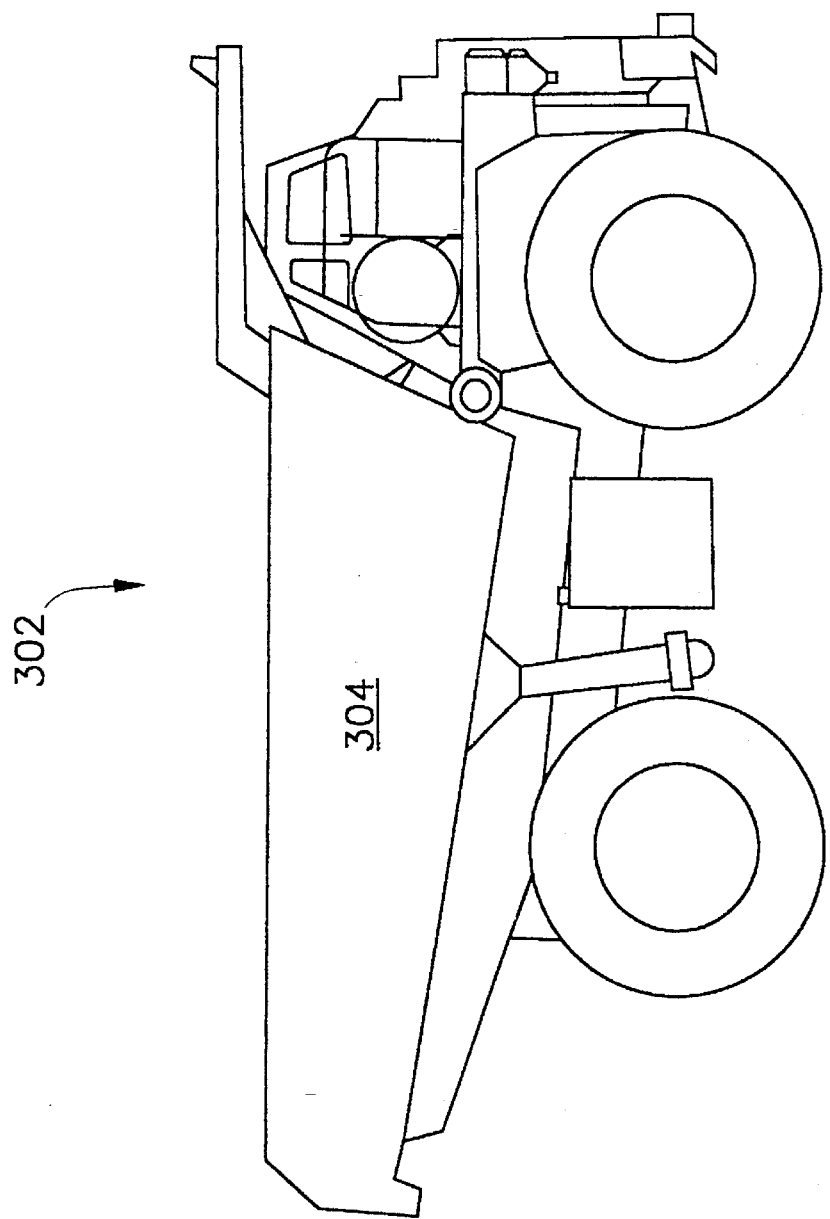
FIG. 3 is an illustration of a hauling machine having a truck bed.

With particular reference to FIG. 3 an illustration of an off-highway truck (OHT) 302 is shown. The OHT 302 includes a truck bed 304 for storing, carrying, and transporting loaded material.

Figure 2:
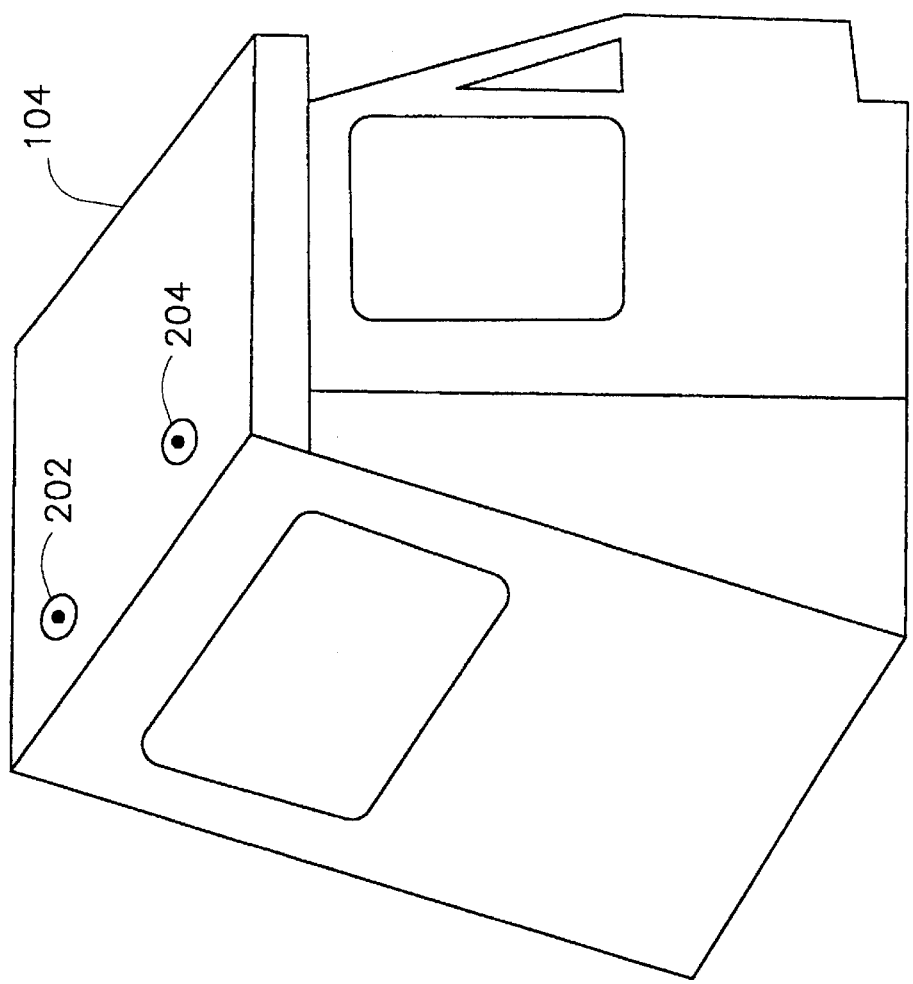
FIG. 2 is an illustration of the operator's cab of the loading machine of FIG. 1.
Figure 4:
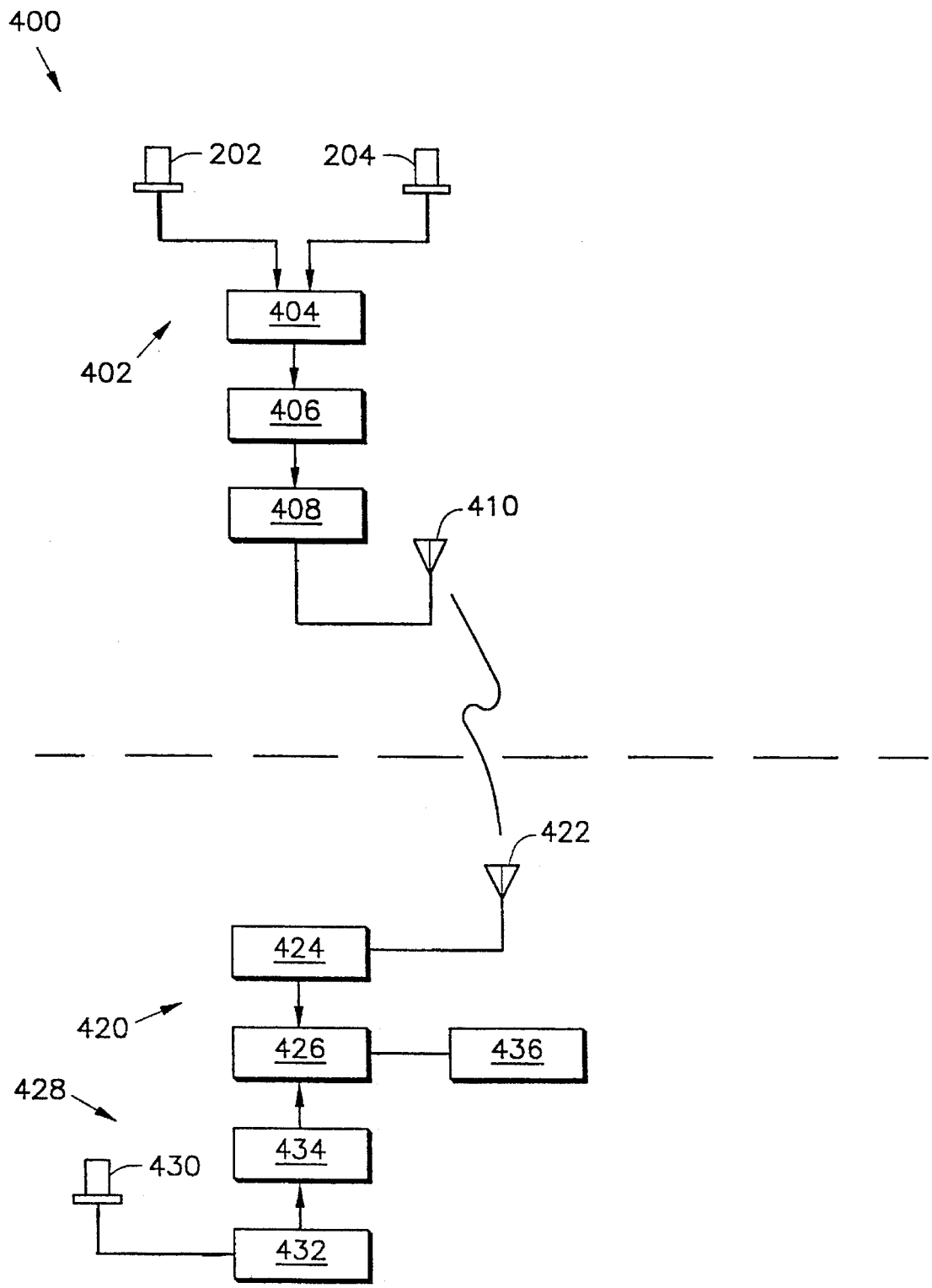
FIG. 4 is a block diagram of a GPS means of the loading machine of FIG. 1 and a GPS means of the hauling machine of FIG. 3.

With particular reference to FIGS. 2 and 4, the present invention is adapted to determine the desired location of the hauling machine 302. The system 400 also includes a first positioning means 402 for determining the position of the loading machine 102 and responsively producing a first position signal.

In the preferred embodiment, the first positioning means 402 incorporates a Global Positioning System (GPS). The first positioning means 402 receives signals from a constellation of man-made satellites orbiting the Earth and determines position relative to the Earth by means of triangulation. Preferably, the U.S. Government's NAVSTAR GPS satellites are used.

With reference to FIGS. 2 and 4, the first positioning means 402 includes first and second GPS antennas 202, 204. As shown, the first and second GPS antennas 202, 204 are mounted on the operator's cab 104 of the loading machine 102 at two known locations, separated by a known distance.

The first positioning means 402 includes a first receiving means 404. The first receiving means 404 is coupled to the first and second GPS antennas 202, 204 and is adapted to determine the terrestrial position of the loading machine 102.

In one embodiment, the first receiving means 404 includes two GPS receivers, one connected to each of the first and second GPS antennas 202, 204. Each GPS receiver determines the terrestrial position of a respective antenna 202, 204.

In the preferred embodiment, the terrestrial position of the loading machine 102 is defined as the center of the bucket of the loading machine 102. Thus, the first receiving means 404 translates the determined position of at least one of the antennas into the position of the center of the bucket. This is accomplished using the known geometry of the loading machine and the relative positions of the linkage which connects the bucket to the loading machine. The geometry of the linkage is determined by at least one linear or rotary position sensor (not shown).

In addition, by determining the terrestrial position of both the first and second GPS antennas 202, 204, the heading (orientation) of the loading machine can be determined.

In a second embodiment, the first receiving means 404 includes a single GPS receiver connected to both the first and second GPS antennas 202, 204. The GPS receiver switches between each antenna and alternately determines the position of each.

In the preferred embodiment, the first GPS receiving means 404 also includes a microprocessor based controller for receiving signals from the GPS receiver(s) and responsively determining the terrestrial position and heading of the loading machine 102. The controller may also be adapted to receive signals from one or more pseudolites and/or a base station in order to increase the accuracy of position determinations. One suitable GPS system is disclosed in U.S. application Ser. No. 07/628,560 filed Dec. 3, 1990, titled "Vehicle Position Determination System and Method".

The system 400 also includes a first processing means 406 for receiving the first position signal, determining a desired location of the second machine 302 as a function of the first position signal, and responsively producing a desired location signal.

The desired location of the second machine 302 is based on the current position of the first machine 102 and the most efficient or optimum path for the first machine to travel to achieve a position suitable for dumping. The most optimum path is determined as a function of the physical dimensions, turning limits, and clearances of the machines, operator comfort, and the geographic limitations of the work site.

The desired location of the hauling machine 302 preferably corresponds to the center of the hauling machine 302. This desired location also corresponds to the position of the center of the bucket when the loading machine 102 is in the dumping position.

Alternatively, the desired location of the hauling machine 302 may correspond to a point other than the center of the hauling machine 302, e.g., the center of a hauling bed of the hauling machine or any point within the hauling bed. Preferably, the desired location of the hauling machine again corresponds to the center of the bucket while the loading machine 102 is in the dumping position.

Typically, a work site will be processed using a fleet of machines of different types and models. Each different type of machine has different physical dimensions. The system tracks the type of each machine and automatically adjusts the optimum path and the desired position of the hauling machine as a function of the physical parameters of both the loading machine and the hauling machine being utilized.

The first factor, the physical turning limits of the machine refers to the maximum turning ratio of the machine. The maximum turning ratio results in a minimum loader clearance circle. Without considering the other factors, the maximum turning ratio is the most efficient method. Therefore, the turning ratios of the optimum paths have some value less than the maximum turning ratio.

The loading machine may be operated manually, autonomously, or semi-autonomously. In the manual or semi-autonomy embodiments, an operator may be present on the machine. The optimum path may also be limited by what is comfortable to the operator. The maximum allowed turn ratio will vary between machine models and will be predetermined as a pseudo-maximum turn ratio.

Figure 10:
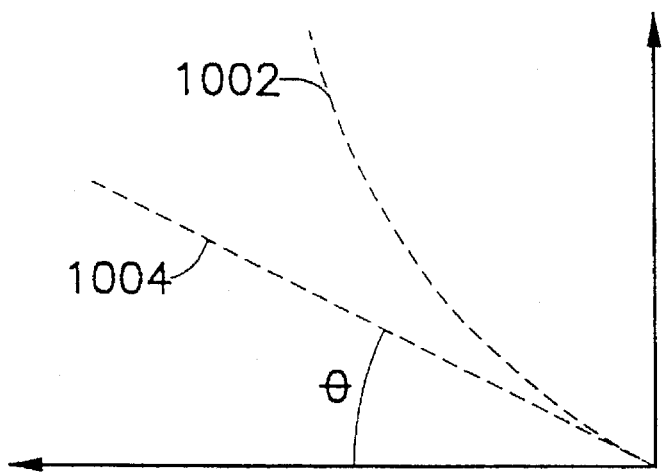
FIG. 10 is a illustration showing an optimum path of the loading machine according to an embodiment of the present invention.

Also, the geography of the work site must be considered. With reference to FIG. 10, ideally, the optimum path consists of a first portion 1002 and a second portion 1004. The first portion 1002 is curved with a predefined turning ratio. The loading machine 102 digs or loads material at one end of the first portion 1002. The second portion 1004 is defined as a straight line. The desired location of the second machine 302 is located at the end of the second portion 1004. The loading machine 102 preferably loads the hauling machine 302 at a right angle to the hauling truck 302.

The optimum path will be defined as shown in FIG. 10. Preferably, θ is less than or equal to 90°. The closer the hauling machine 302 is to the loading machine 102, the more efficient the path. Thus, the optimum path has the machine as close as possible given the geographic and other limitations.

Preferably, the dumping position is determined during the loading portion of the loading machine's work cycle. The dumping position is not modified while the loading machine maneuvers from the loading position to the dumping position. However between successive work cycles, the dumping position may be modified to allow for even distribution of material into the hauling machine 302. Additionally, the loading position may be varied along the face of the material. The optimum path is adjusted accordingly and the hauling machine is preferably stationery.

The first processing means 406 receives the position of the loading machine 102 during the digging or loading portion of its work cycle. Preferably, the first processing means 406 includes a memory means which stores the maximum or pseudo-maximum turning ratio and the physical parameters of the hauling machine. The first processing means 406 calculates the desired location of the second machine 302 using the definition of the optimum path as an offset from the loading point of the first machine 102. That is, the optimum path is added to the loading position of the first machine. The coordinates of the desired location of the second machine 302 including a desired heading are transmitted to the second machine 302.

In the preferred embodiment, the first processing means 406 includes a database of the current work site, including its size and boundaries and any obstacles. The optimum path is modified if the path as shown in FIG. 10 is not viable. For example, θ may be increased and the length of the second portion 1004 may be modified.

Figure 11:
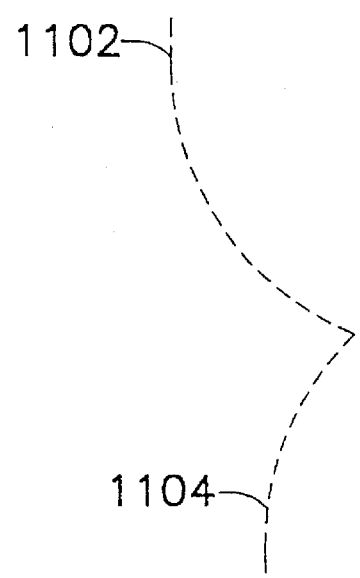
FIG. 11 is a illustration showing an optimum path of the loading machine according to another embodiment of the present invention.

Additionally, the loading machine 102 may be limited to turning in one direction. For example from the digging position, the loader is constricted on the left. Therefore, it may only back up and turn to its right. In another example, the loader is constricted on both sides and there is no room to position the truck parallel to the loading machine's digging position. Thus the optimum path is defined as shown in FIG. 11. A first portion 1102 is similar to the first portion 1002 of FIG. 10. A second portion 1104 is also curved such that the digging position and the loading position of the first machine 102 are parallel and preferably along a common line.

Returning to FIG. 4, a transmitting means 408 receives the first desired location signal and responsively transmits a desired location radio signal via a transmitting antenna 410. The transmitting means 408 includes a low power radio frequency transmitter. Preferably, the low power radio frequency transmitter is a narrow-band transmitter or a spread-spectrum transmitter.

A controlling means 420 on-board the hauling machine 302 includes a second positioning means 428. The second positioning means 428 determines the position of the second machine 302 and responsively produces a second position signal. In the preferred embodiment, the second positioning means 428 is a differential or kinematic GPS system. The second positioning means 428 includes a third GPS antenna 430 for receiving electromagnetic signals from GPS satellites. A second GPS receiving means 432 is connected to the third GPS antenna 430. The GPS receiving means 432 includes a GPS receiver. A GPS processing means 434 receives signals from the GPS receiver and preferably from a base station and/or psuedolites and responsively determines the position of the hauling machine 302.

The controlling means 420 also includes an RF receiving antenna 422 for receiving the desired location signal transmitted by the first positioning means 402. The RF receiving antenna 422 is connected to an RF receiving means 424. The RF receiving means 424 preferably includes an RF receiver.

A navigation means 426 receives a position signal indicative of the position of the hauling machine 302 from the second positioning means 428 and the desired location signal from the RF receiving means 424 and responsively produces a navigation signal.

In one embodiment, the hauling machine 302 is autonomously operated. The navigation means 302 includes microprocessor based control systems for providing autonomous control of the hauling machine's systems and enabling the hauling machine 302 to be controlled along the desired path. For a more complete description of such an autonomous system, please see the above reference U.S. application Ser. No. 07/628,560 filed Dec. 3, 1990, titled "Vehicle Position Determination System and Method".

In another embodiment, the hauling machine 302 is manually operated. The controlling means 302 includes a visual display means 436 for visually providing information to an operator. In a first embodiment, the navigation signal is received by the visual display means which is adapted to graphically illustrate the current position of the hauling machine 302, the current position of the loading machine 102, and the desired position of the hauling machine 302. This enables the operator to accurately position the hauling machine 302 in the most efficient location for loading by the loading machine 102. In a second embodiment, the navigation means 426 is also adapted to determine a desired path for the hauling machine 302 to follow. The navigation signal also comprises the optimum path as described above. The display means 436 is adapted to provide a visual display of the desired path.

In still another embodiment, the system 400 may include one loading machine 102 and at least two hauling machines 302. The system 400 is adapted to load hauling machine on either side of the loading machine. That is, absent geographic limitations, the loading machine is adapted to alternately load machines on its right and on its left.

Figure 5:
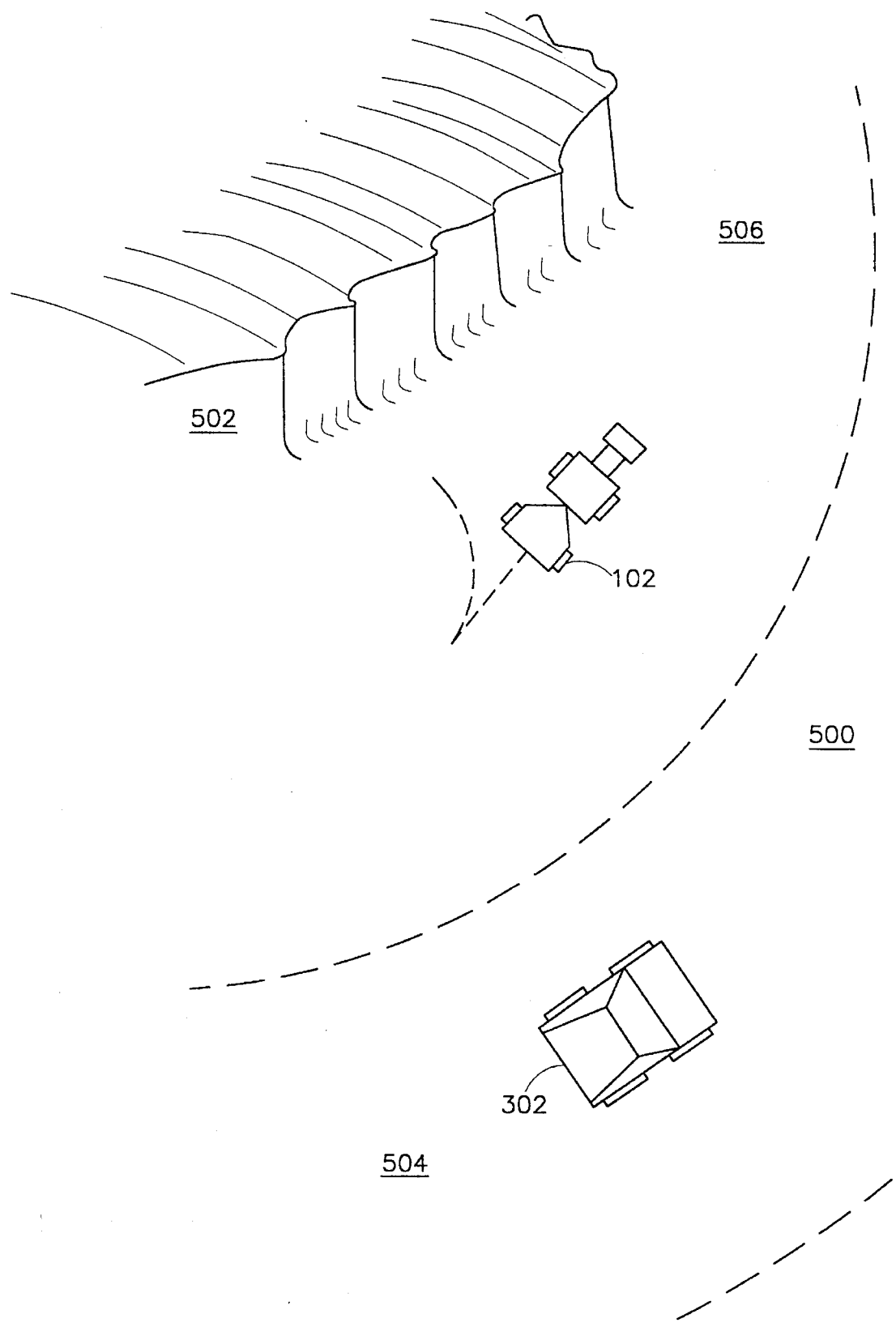
FIG. 5 is an illustration of a work site showing a loading machine and a hauling machine during one portion of the loading cycle according to an embodiment of the present invention.

With reference to FIG. 5 a system 400 adapted to a portion of a particular work site 500 is illustrated. The loading machine's work area is defined as the staging area 506. A loading machine 102 is adapted to dig a particular material 502 from the staging area 506. The work site 500 includes a haul road 504 for traversing the work site 500. The hauling machine 302 traverses the work site along a haul road which provides a path between the staging area and the rest of the work site 500.

Figure 6:
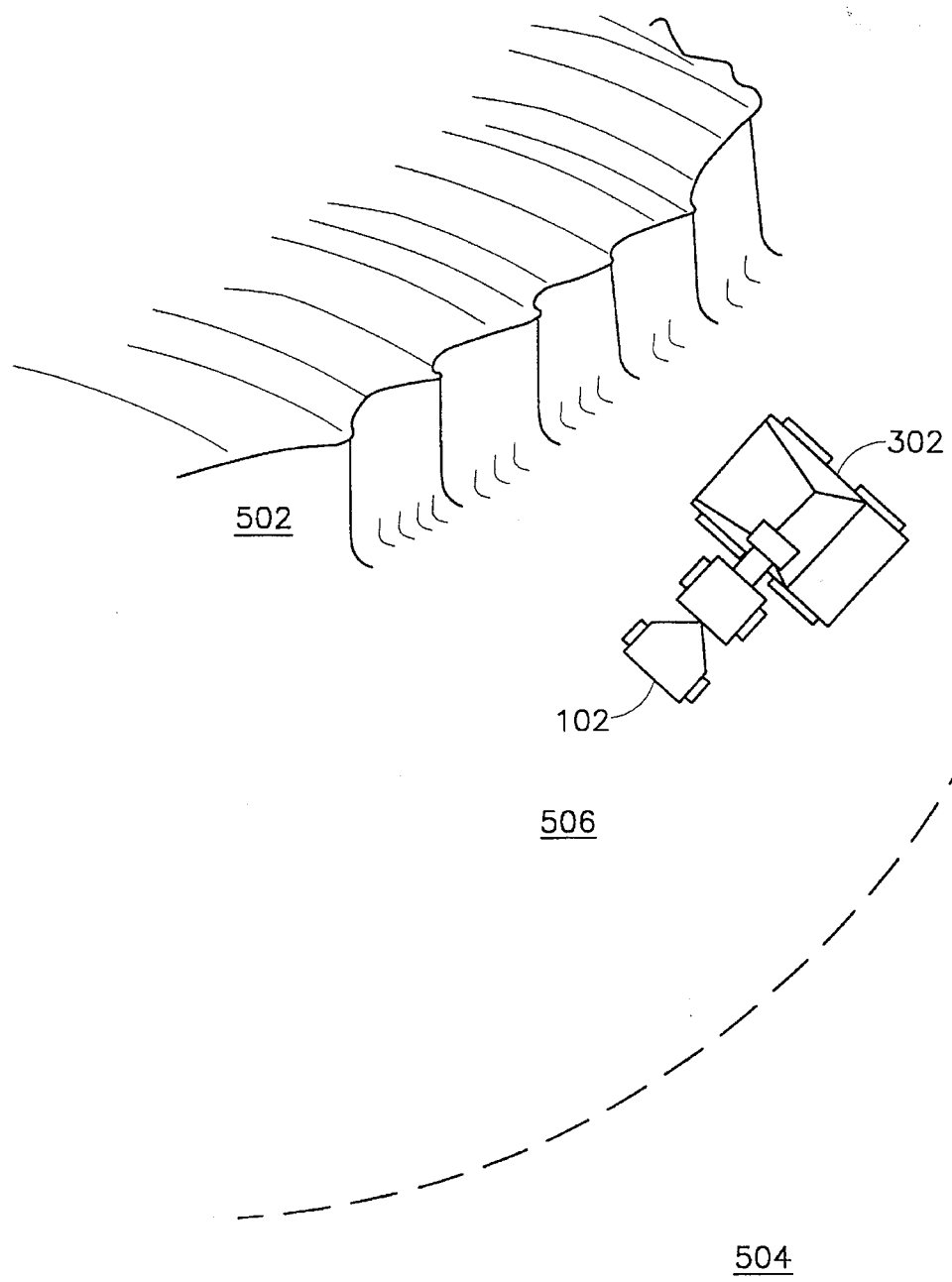
FIG. 6 is an illustration of a work site showing a loading machine and a hauling machine during another portion of the loading cycle according to an embodiment of the present invention.
Figure 7:
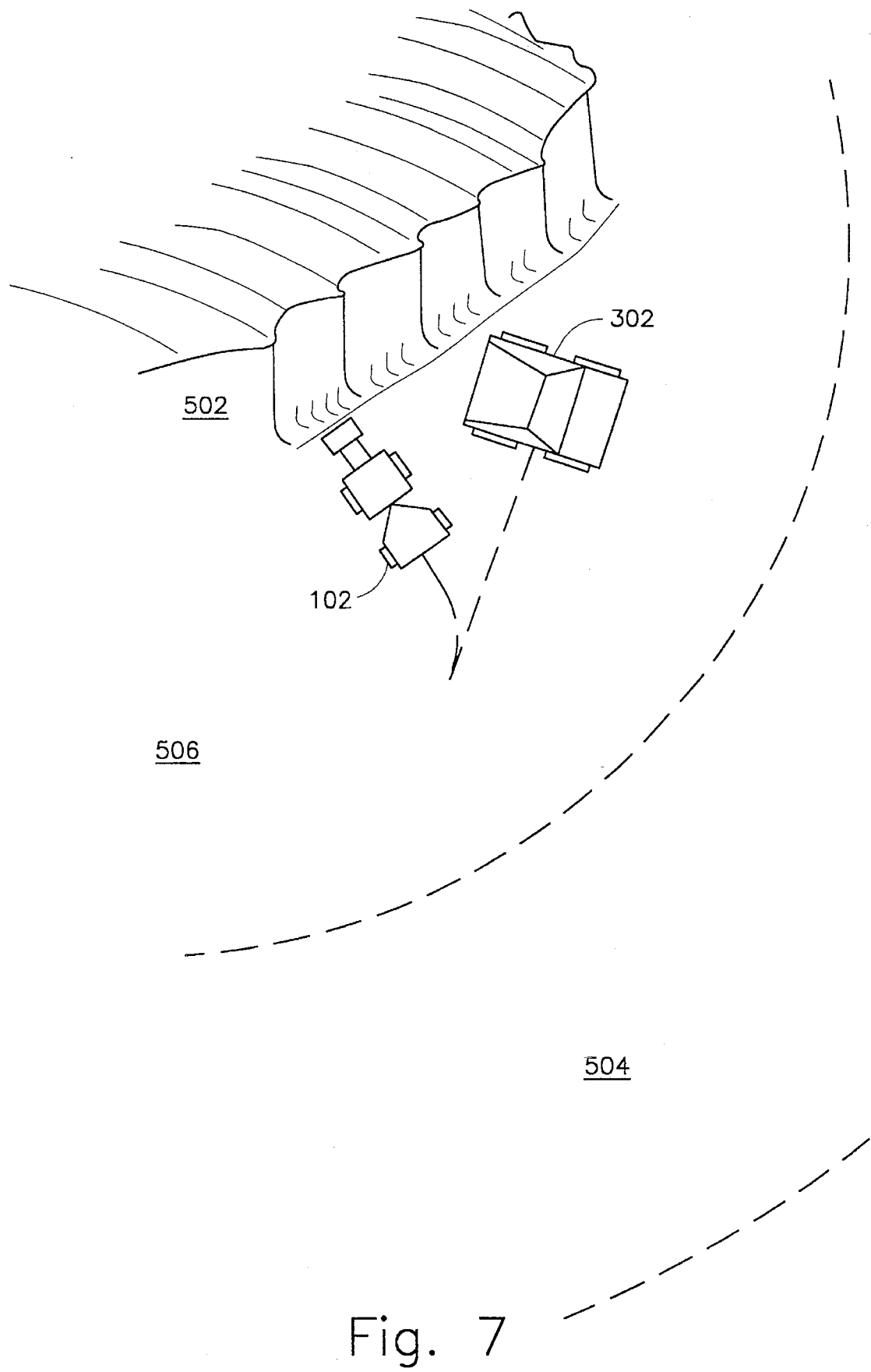
FIG. 7 is an illustration of a work site showing a loading machine and a hauling machine during still another part of the loading cycle according to an embodiment of the present invention.

As seen in FIG. 6, the desired location of the hauling machine 302 is positioned directly under the bucket of the loading machine 102 in its dumping position. The relationship of the loading machine 102 in its digging position, the optimum path and the hauling machine 302 is the desired position is illustrated in FIG. 7.

With reference to FIGS. 12–16, the calculation of the optimum path and the desired position and heading of the hauling machine, according to the preferred embodiment of the present invention will be explained. The desired position of the hauling machine corresponds to its center.

From the loading machine positioning means 402 the initial position or digging position (E,N,⋖) of the loading machine 102 is known. Additionally, the physical dimensions of the machines are known. All measurements are in meters or radians, unless otherwise specified.

Figure 12:
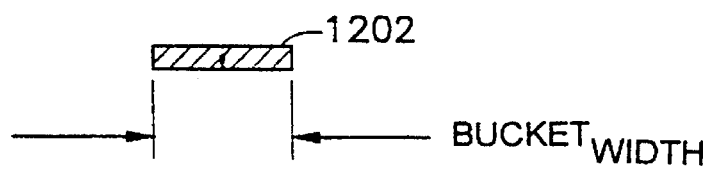
FIG. 12 is a diagrammatic representation of the top view of the bucket of a loading machine having a bucket width of $bucket_{width}$.

In FIG. 12, a top view of the bucket 1202 of the loading machine is shown. The bucket 1202 has a width (from side to side of the loading machine 102) of $bucket_{width}$. The internal arrow points in the direction of the front of the loading machine.

Figure 13:
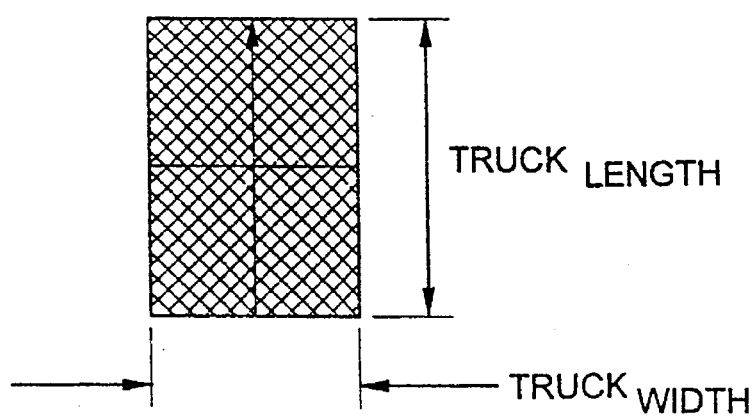
FIG. 13 is a diagrammatic representation of the top view of the hauling machine having a length of $truck_{length}$ and a width of $truck_{width}$.

In FIG. 13, a top view of a representation of a hauling machine 1302 is shown. The hauling machine 1302 has a length of $truck_{length}$ and a width of $truck_{width}$. The internal arrow points in the direction of the front of the hauling machine.

Figure 14:
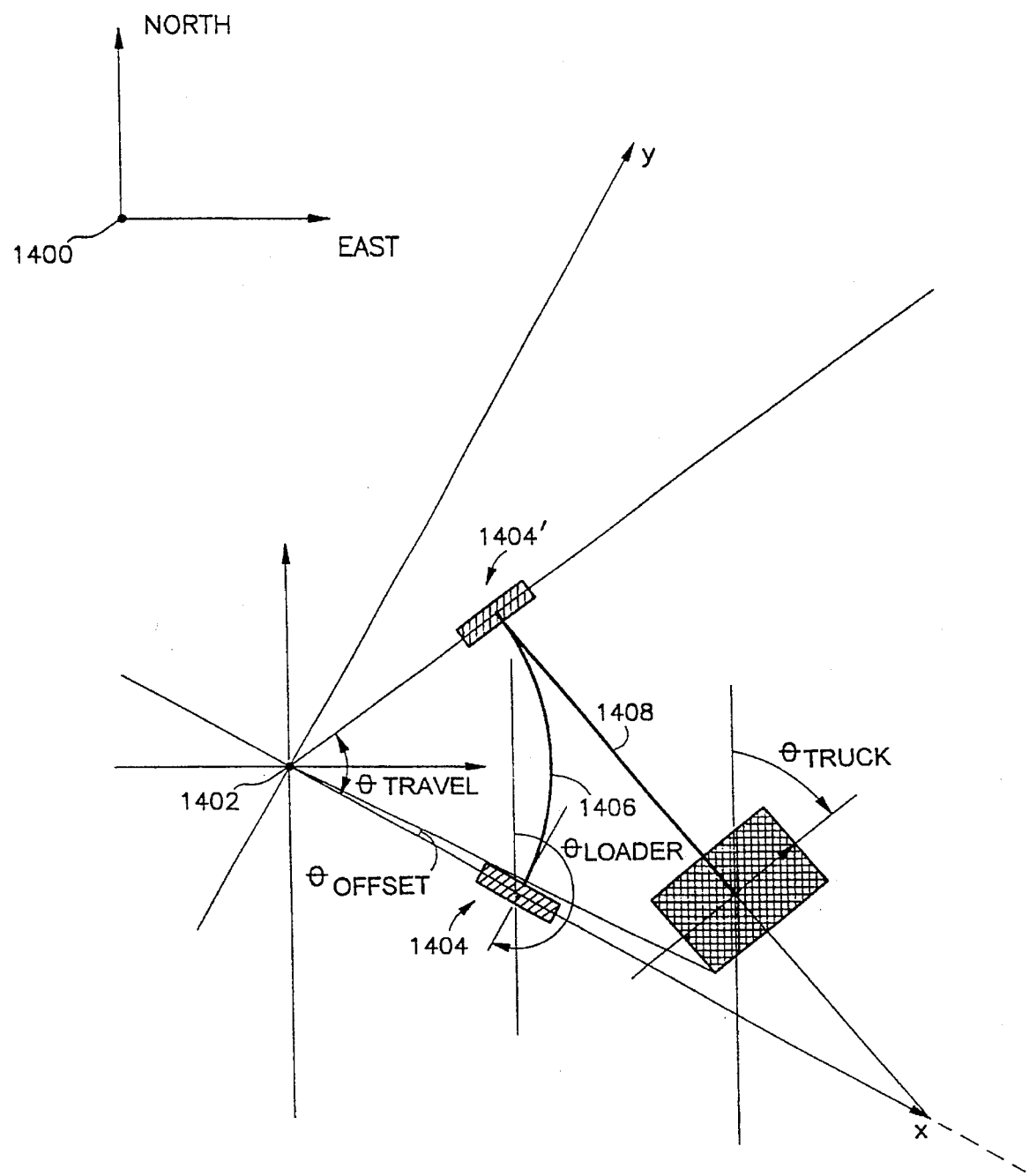
FIG. 14 is a diagrammatic representation of a loading machine and a hauling machine illustrating geometric parameters of a optimum path, according to an embodiment of the present invention.

With reference to FIG. 14, the initial position of the loading machine 102 is the center of the bucket 1202 and is measured from a global reference point 1400.

A local reference point 1402 is a point along a transverse axis of the bucket which passes through its center point. In the digging position 1404, the loading machine has a heading ($\theta_{loader}$) measured clockwise from the north. The desired position of the hauling machine 1302 has a heading $\theta_{truck}$) measured clockwise from the north.

Certain assumptions must be made. First, the loading machine backs up from the digging position 1404 to a secondary position 1404' along a circular path 1406. Additionally, the center of rotation of the loading machine's motion is to the right, that is, the loading machine backs up to the right. From the secondary position 1404', the loading machine's path follows a straight line 1408 tangential to the circular path 1406. Also, the hauling machine is assumed to navigate into the staging area in reverse, that is, the back of the hauling machine will be nearest the material being loaded.

Other assumptions can be made without departing from the spirit of the invention. For example, the loading machine could back up to the left and/or the hauling machine could navigate into the staging area in forward.

For purposes of discussion, the material being loaded will be assumed to be in a straight line parallel to the cutting edge of the loading machine while the loading machine is in the digging position.

Figure 15:
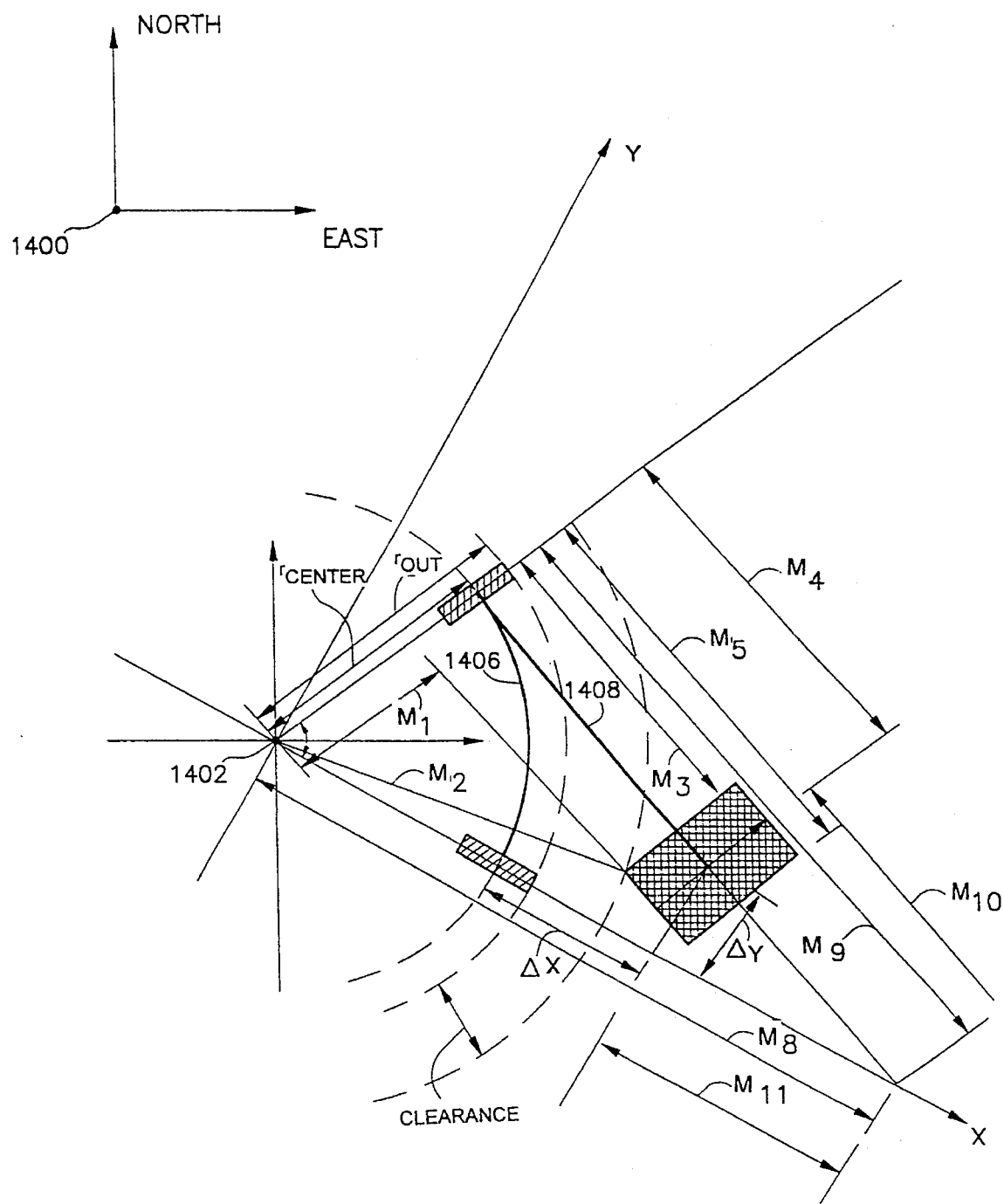
FIG. 15 is a diagrammatic representation of the loading machine and a hauling machine illustrating additional geometric parameters of the optimum path of FIG. 14.
Figure 16:
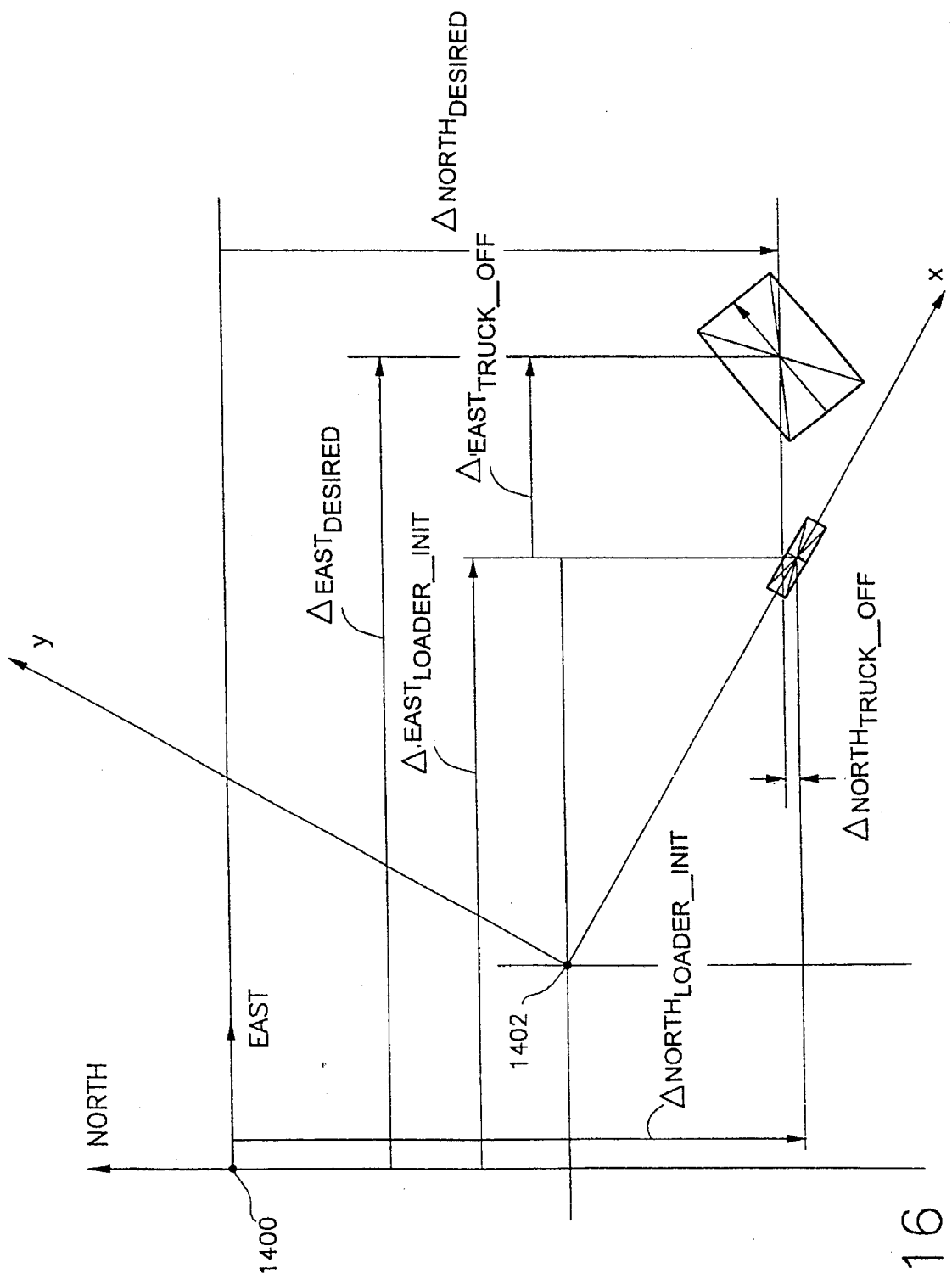
FIG. 16 is a diagrammatic representation of the loading machine and a hauling machine illustrating even more geometric parameters of the optimum path of FIG. 14.

With specific reference to FIG. 15, several user parameters must be preset. First, the clearance (CLEARANCE) between the outer edge of the bucket and the nearest point of the hauling machine must be set. The loading machine 102 travels an angular distance of $\theta_{travel}$. $\theta_{travel}$ is determined as the sum of a minimum angular distance ($\theta_{min}$) and a predetermined offset ($\theta_{offset}$). The angular offset ($\theta_{offset}$) must be set. $\theta_{offset}$ must be greater or equal than zero (0). If $\theta_{offset}$ is equal to 0, then the corner of the hauling machine 302 is in contact with the material (assuming the material edge to be linear).

Additionally, the diameter of the circle defined by the loader clearance circle ($clearance_{diameter}$) must be set. The loader clearance circle is the circle defined by the outer edge of the bucket as it follows the circular path 1406. Thus, the diameter of the loader clearance circle is 2 times (the distance from the center point of the bucket to the local reference point 1402 plus ½ of $bucket_{width}$), With reference to FIGS. 14 and 16, also determined are the orientation ($\theta_{loader}$) of the bucket in the digging position measured from the north, the east coordinate ($east_{loader\_init}$) of the center of the bucket measured from the global reference point 1400, and the north coordinate ($north_{loader\_init}$) of the center of the bucket measured from the global reference point 1400.

First, the radius of the circle defined by the outer edge of the bucket as the loading machine traverse the circular path 1406 is determined by:

$$r_{out} = clearance_{diameter}/2.$$

Then, the radius of the circle defined by the center of the bucket as the loading machine traverse the circular path 1406 is determined by:

$$r_{center} = r_{out} - (bucket_{width}/2).$$

With specific reference to FIG. 15, the next step involves the calculation of the desired position of the hauling machine as offsets from the center of the bucket. For the purposes of these calculations an X axis is defined as originating at the reference point 1402 and passing through the center point of the bucket. Thus, a Y axis extends from the reference point 1402 at a right angle to the X axis. To calculate the x and y offsets between the digging position of the bucket and the desired position of the hauling machine the following intermediate calculations are made:

$$m_1 = r_{center} - (truck_{length}/2),$$

$$m_2 = r_{out} + CLEARANCE,$$

$$m_3 = [(m_1)^2 + (m_2)^2]^{1/2},$$

$$m_4 = m_3 + (truck_{width}/2),$$

$$m_5 = m_3 + truck_{width}.$$

$$m_8 = r_{center}/COS(\theta_{travel}),$$

$$m_9 = r_{center} * tan(\theta_{travel}),$$

$m_{10} = m_9 - m_4$, and $m_{11} = m_{10} * \cos((\pi/2) - \theta_{travel})$.

Now, the x and y offsets of the hauling machine from the loading machine can be determined:

$\Delta x = m_8 - m_{11} - r_{center}$, and $\Delta y = m_{10} * \sin((\pi/2) - \theta_{travel})$.

The minimum angular distance that the loading machine can travel is determined as:

$\theta_{min} = \tan^{-1}(m_5/m_1)$.

Thus, the total angular distance to be travelled ($\theta_{travel}$) is determined as:

$\theta_{travel} = \theta_{min} + \theta_{offset}$.

The heading of the hauling machine in the desired position ($\theta_{truck}$) is thus:

$\theta_{truck} = \theta_{loader} - \theta_{travel} - \pi/2$.

Preferably, the desired position of the hauling machine is determined as north and east offsets from the global reference point 1400.

If $\theta_{loader}$ is an odd multiple of $\pi/2$ then the offsets are determined by:

$\Delta north_{truck\_off} = \Delta x * \sin(\pi - \theta_{loader})$ and $\Delta east_{truck\_off} = \Delta y * \sin(\theta_{loader} - \pi)$.

Otherwise, the offsets are determined by:

$\Delta north_{truck\_off} = \Delta y * \cos(\pi - \theta_{loader})$ and $\Delta east_{truck\_off} = \Delta x * \cos(\pi - \theta_{loader})$ Now the north and east off-sets of the desired position of the hauling machine are determined:

$\Delta north_{desired} = \Delta north_{loader\_init} + \Delta north_{truck\_off}$ and $\Delta east_{desired} = \Delta east_{loader\_init} + \Delta east_{truck\_off}$.

If the loading machine is to rotate about a point to the left of the loading machine, that is, back up to the left, then the previous calculations are transformed by:

$\Delta north_{truck\_off} = -\Delta north_{truck\_off}$, $\Delta east_{truck\_off} = \Delta east_{truck\_off}$, and $\theta_{truck} = 2\pi - \theta_{truck}$.

If the hauling machine is driven forward into the loading stage $\theta_{truck}$ is determined by:

$\theta_{truck} = \theta_{loader} - \theta_{travel} + \pi/2$.

Industrial Applicability

With reference to the drawings and in operation the system 400 is adapted to provide navigation signals between two earthmoving or construction machines.

Figure 8:
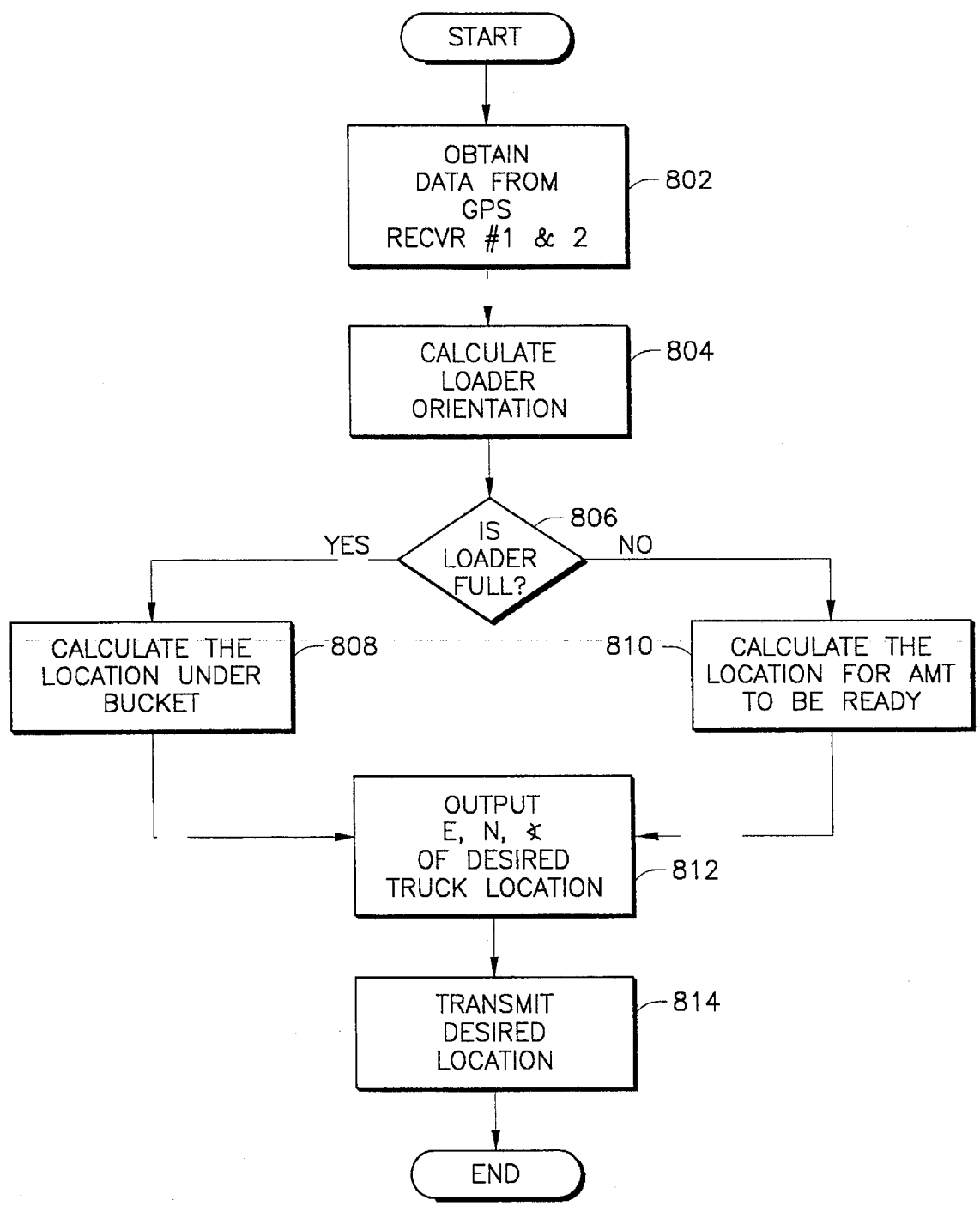
FIG. 8 is a flow diagram illustrating operation of the loading machine of FIG. 1, according to an embodiment of the present invention.

With particular reference to FIG. 8, the operation of the loading machine 102 in the preferred embodiment is illustrated. In a first control block 802, data from the first and second GPS receivers is obtained. In a second control block 804, the orientation, that is, position and heading, is determined based on the data received from the GPS receivers. In a first decision block 806, if the bucket of the loading machine 102 is full and the loading machine 102 is at its dumping position then control proceeds to a third control block 808. If the bucket is not full or the loading machine 102 is not at the its dumping position then control proceeds to a fourth control block 810.

In the third control block 808, the location directly under the bucket and the desired heading are calculated and used as the desired location of the hauling machine 302. In the fourth control block 810, the desired location of the hauling machine 302 is calculated based on the position and orientation of the loading machine 102 and the optimum path as described above. In a fifth control block 812, the desired location, E,N, ∢, (Easting, Northing, heading) of the hauling machine 302 is delivered to the transmitting means 408. It is important to note that the desired position of the hauling machine is determined once (during loading of the bucket) and does not change while the loading machine 102 is maneuvering to its dumping position or waiting for the second hauling machine 302.

In a sixth control block 814, the desired location and heading are transmitting via a RF transmitter to the hauling machine 302.

Figure 9:
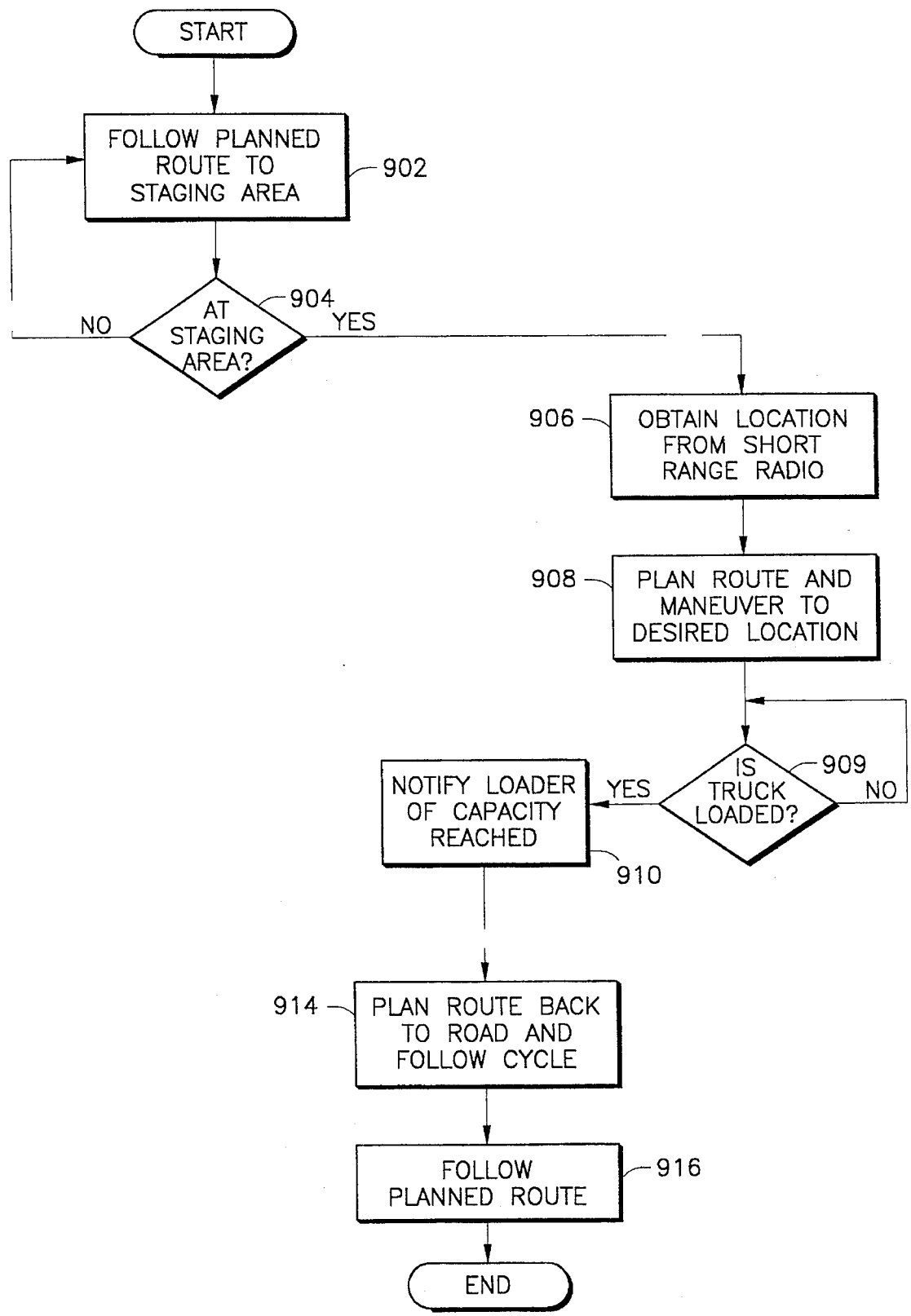
FIG. 9 is a flow diagram illustrating operation of the hauling machine of FIG. 3, according to an embodiment of the present invention.

With reference to FIG. 9, the operation of the hauling machine 302 in the preferred embodiment is illustrated. In a seventh control block 902, the hauling machine 302 follows a planned route to the staging area 506. In a second decision block 904, if the hauling machine 302 is at the staging area 506, then control proceeds to an eighth control block 906. If the hauling machine 302 is not at the staging area 506 then control returns to the seventh control block 902.

In the eighth control block 906, the hauling machine positioning means 420 receives the desired location of the hauling machine from loading machine positioning means 402 via the transmitting means 408. In a ninth control block 908, the navigation means 426 plans a route for the hauling machine to traverse to get to the desired location and autonomously maneuvers the hauling machine 302 to the desired location.

In a third decision block 909, if the hauling machine 302 is filled to capacity then control proceeds to a tenth control block 910. In the preferred embodiment, the hauling machine 302 is equipped with a Truck Payload Monitoring System (TPMS) adapted to determine payload. A suitable TPMS is described is U.S. Pat. No. 4,835,719 issued May 30, 1989, to Giles Sorrells, which is commonly owned by the assignee of the present invention.

In the tenth control block 910, the loading machine 102 is notified that the hauling machine 302 is filled to capacity.

In an eleventh control block 914, the navigation means 426 plans a route back to the hauling road 504. In a twelfth control block 916, the hauling machine 302, once on the hauling road, follows its planned route to its next destination.

Other aspects, objects, and features of the present invention can be obtained from a study of the drawings, the disclosure, and the appended claims.

We claim:

1. A system for providing navigation signals for a second machine relative to a first machine operating at a work site, comprising:

first positioning means located at the first machine for determining the position of the first machine and responsively producing a first position signal;

first processing means located at the first machine for receiving said first position signal, determining a desired location of the second machine as a function of the first position signal and a predetermined path, and responsively producing a first desired location signal;

transmitting means for receiving said first desired location signal and responsively transmitting a first desired location transmitted signal; and navigation means located at the second machine for receiving said first desired location transmitted signal.

2. A system, as set forth in claim 1, including a second positioning means located at the second machine for determining the position of the second machine and responsively producing a second position signal.

3. A system, as set forth in claim 2, wherein the second machine is manually operated to position the second machine at said desired position.

4. A system, as set forth in claim 2, wherein said navigation means includes means for receiving said second position signal and responsively producing a desired path for the second machine to follow to reach said desired location as a function of the second position signal and said first desired location transmitted signal and for responsively producing a navigation signal.

5. A system, as set forth in claim 4, wherein said navigation signal is a visual display signal to the operator indicative of the path to the desired location.

6. A system, as set forth in claim 4, wherein the second machine is autonomously operated, said navigation means being adapted for controllably moving the second machine along said desired path and positioning said hauling machine at said desired position.

7. A system, as set forth in claim 2, wherein said first and second positioning means comprise Global Positioning Systems.

8. A method, as set forth in claim 1, wherein the first machine is a loading machine and said predetermined path is determined as a function of physical turning limits of the loading machine and geographic limitations of the work site.

9. A method, as set forth in claim 8, wherein the second machine is a hauling machine, said predetermined path is further determined as a function of physical turning limits of the hauling machine.

10. A system, as set forth in claim 1, wherein the first machine is operated by an operator.

11. A system, as set forth in claim 1, wherein the first machine is operated autonomously.

12. A system, as set forth in claim 1, wherein the second machine is operated by an operator.

13. A system, as set forth in claim 1, wherein the second machine is operated autonomously.

14. A method for providing navigation signals in a system with first and second machine operating at a work site, including:

determining the position of the first machine and responsively producing a first position signal;

receiving said first position signal, determining a desired location of the second machine as a function of the first position signal and a predetermined path, and responsively producing a desired location signal; and receiving said desired location signal and transmitting said desired location signal from the first machine to the second machine.

15. A method, as set for in claim 14, including the step of receiving said desired location signal at the second machine and responsively producing navigation signals.

16. A method, as set forth in claim 15, wherein said step of producing navigation signals includes the step of providing a visual display of the desired location to an operator of the second machine.

17. A method, as set forth in claim 15, wherein said steps of producing navigation signals includes the steps of determining a desired path from the current position of the hauling machine to the desired location and providing a visual display signal to the operator indicative of the desired path.

18. A method, as set forth in claim 15, wherein said hauling machine is autonomously operated and including the steps of controllably moving the second machine along said desired path and positioning said hauling machine at said desired position.

* * * * *

UNITED STATES PATENT AND TRADEMARK OFFICE
CERTIFICATE OF CORRECTION

PATENT NO. : 5,546,093

DATED : August 13, 1996

INVENTOR(S) : Adam J. Gudat et al

It is certified that error appears in the above-identified patent and that said Letters Patent is hereby corrected as shown below:

Claim 8:
In column 11, line 44, delete "method" and replace with "system".

Claim 9:
In column 12, line 1, delete "method" and replace with "system".

Signed and Sealed this

Twenty-ninth Day of April, 1997

Attest:

BRUCE LEHMAN

Attesting Officer

Commissioner of Patents and Trademarks